United States Patent [19]

Kuhn

[11] Patent Number: 4,563,763
[45] Date of Patent: Jan. 7, 1986

[54] METHOD AND APPARATUS FOR COOLING A SLAB LASER

[75] Inventor: Kelin J. Kuhn, Mountain View, Calif.

[73] Assignee: Board of Trustees, Leland Stanford University, Stanford, Calif.

[21] Appl. No.: 524,876

[22] Filed: Aug. 22, 1983

[51] Int. Cl.$^4$ .............................................. H01S 3/04
[52] U.S. Cl. .......................................... 372/35; 372/66; 372/72; 372/34
[58] Field of Search ....................... 372/35, 68, 71, 72, 372/66, 34

[56] References Cited

U.S. PATENT DOCUMENTS

| | | | |
|---|---|---|---|
| 3,633,126 | 1/1972 | Martin et al. | 372/35 |
| 3,679,999 | 7/1972 | Chernoch | 372/35 |
| 4,207,541 | 6/1980 | Karger et al. | 372/35 |
| 4,232,276 | 11/1980 | Iwata | 372/35 |
| 4,233,567 | 11/1980 | Chernoch | 372/34 |
| 4,506,369 | 3/1985 | Houston | 372/34 |

Primary Examiner—William L. Sikes
Assistant Examiner—Léon Scott, Jr.
Attorney, Agent, or Firm—Harry E. Aine

[57] ABSTRACT

In a high average power slab laser, heat generated in the laser slab is conducted through a thin layer of thermally conductive gas, such as hydrogen, helium or air, and then through an optically transparent window into a flow of liquid coolant. In a preferred embodiment, a second flow of liquid coolant is employed for cooling of the pumping lamps such lamp liquid coolant flow being partitioned from the slab liquid coolant flow by means of an optically transparent partition through which the pump radiation is directed from the lamps to the slab. In another embodiment, the slab coolant flow is controlled so as to operate the laser slab in a self-annealing temperature regime, whereby thermal stresses are annealed out in use and higher average output beam power is obtained.

12 Claims, 5 Drawing Figures

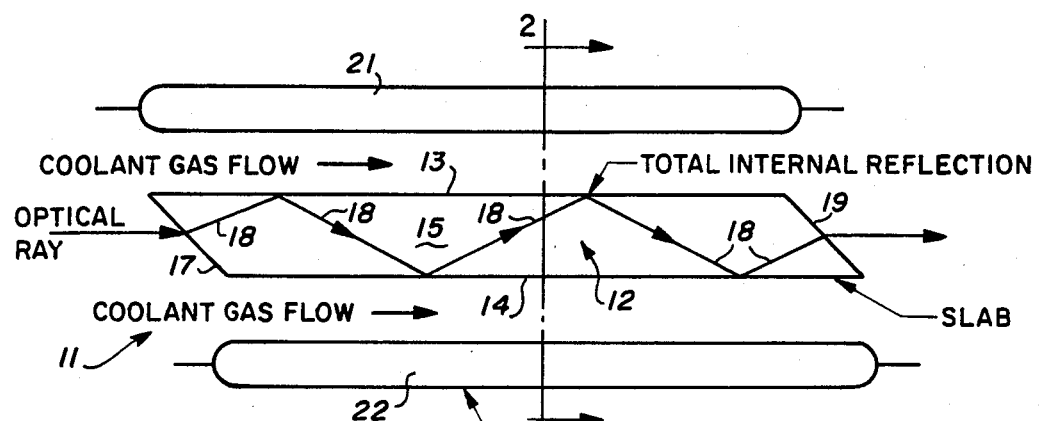
Fig_1 (PRIOR ART)
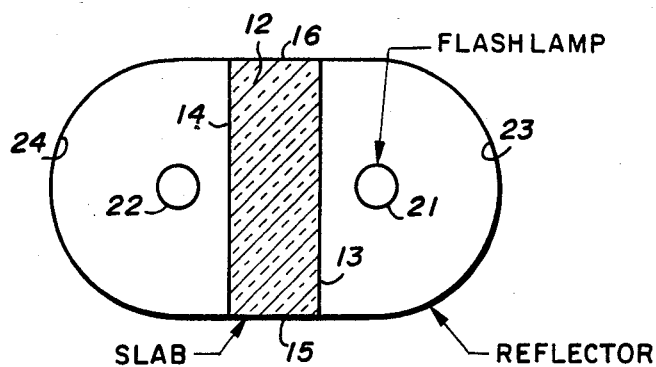
Fig_2 (PRIOR ART)

METHOD AND APPARATUS FOR COOLING A SLAB LASER

The U.S. Government has certain rights in this invention pursuant to Contract No. DAAG 29-81-K-0038 awarded by the U.S. Army Research Office.

BACKGROUND OF THE INVENTION

The present invention relates in general to slab lasers and, more particularly, to an improved method for cooling and operating the laser so as to achieve higher average output power.

DESCRIPTION OF THE PRIOR ART

Heretofore, slab lasers have been proposed wherein a slab of optically pumped lasant material was cooled by directing a stream of gas coolant over the broad faces of the lasant slab for cooling the laser in use. Such a cooling scheme is disclosed and claimed in U.S. Pat. No. 3,633,126 issued Jan. 4, 1972.

The problem with gas flow cooling of a glass laser slab is that the gas has insufficient heat capacity for removing high average power heat loads produced by a high average power slab laser. More particularly, the heat to be removed from the slab is approximately equal to the average output power of the laser. Thus, for a 1 kilowatt laser approximately 1 kilowatt of heat must be removed from the laser slab.

It has also been proposed, in the aforecited patent, to cool the laser slab by flowing a liquid coolant across the broad faces of the slab in heat exchanging relation therewith. The problem with direct liquid cooling is that the liquid coolant, contacting the heated optical surface of the slab, can boil off at high average power and generate time varying distortions of the laser beam. Moreover, liquid coolant coming in contact with the optical surface can deposit particles or films on the internally reflecting faces which degrade the laser beam quality. Moreover, utilizing the same coolant flow for cooling the lamps and the laser slab, as proposed in the aforecited patent, creates heat gradients within the laser material and can result in anomalous thermal focusing effects in the laser slab.

Thus, it is desired to obtain an improved method and apparatus for cooling of slab lasers utilizing a gas coolant in contact with the broad faces of the laser slab, whereby films are not deposited upon the slab faces and boiling of the coolant at high average powers is avoided in use.

SUMMARY OF THE PRESENT INVENTION

The principal object of the present invention is the provision of an improved method and apparatus for cooling of slab lasers and operating same.

In one feature of the present invention, heat generated in the laser slab is conducted through a thin layer of thermally conductive gas, and thence through a transparent window into a flow of liquid coolant, whereby high average power produced in the laser slab is removed, in use, without attendant problems of depositing particles or films on the internally reflecting faces of the slab and without boiling the coolant which can otherwise generate time varying distortions of the output laser beam.

In another feature of the present invention, the laser pumping lamps are cooled by means of a flow of liquid coolant which is partitioned from the flow of liquid coolant into which the heat from the laser slab is transferred, whereby control of the laser slab cooling is obtained generally independently of the cooling of the pumping lamps.

In another feature of the present invention, the gas cooling of the laser slab is obtained by suspending the laser slab in a sealed chamber containing a high thermal conductivity gas such as hydrogen or helium.

In another feature of the present invention, cooling of the laser slab is controlled so as to run the laser slab at a temperature sufficiently high to anneal out stresses produced on the slab by operation thereof.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram of a prior art slab laser,

FIG. 2 is a schematic cross-sectional view of the structure of FIG. 1 taken along 2—2 in the direction of the arrows.

DESCRIPTION OF THE PREFERRED EMBODIMENTS

Figure 3:
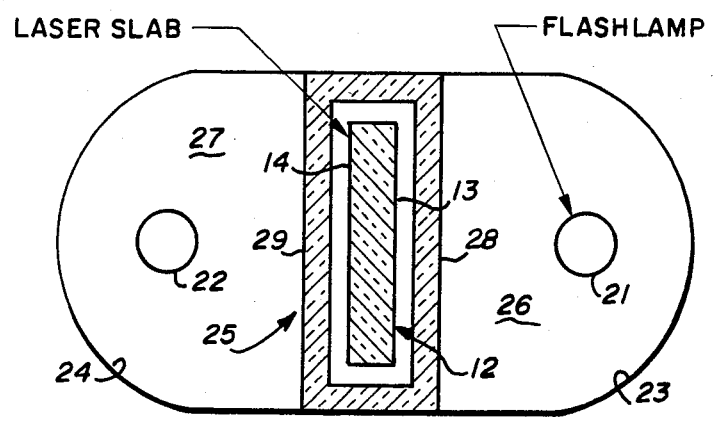
FIG. 3 is a view similar to that of FIG. 2 and incorporating features of the present invention.

Referring now to FIGS. 1 and 2, there is shown a prior art slab laser 11. Briefly, the prior art slab laser 11 is of the type disclosed in the aforecited U.S. Pat. No. 3,633,126, the disclosure of which is hereby incorporated by reference in its entirety. The slab laser 11 includes a slab of lasant material 12, as of Nd:YAG or Nd:glass. The slab 12 has a pair of broad faces 13 and 14 separated by a pair of narrow faces 15 and 16. The laser 11 is a laser amplifier and includes an input face 17 through which optical energy to be amplified is directed into the laser slab 12. Inside the laser slab 12, the optical energy is reflected back-and-forth along a zigzag path 18 between the major faces 13 and 14. In the process, the input ray is amplified by stimulated emission of radiation and exits through output face 19 of the slab 12.

The populations of the energy states of the lasant material of the slab 12 are inverted by means of pumping radiation directed into the slab 12 through the broad faces 13 and 14. The pumping radiation is provided by means of a pair of flashlamps 21 and 22 disposed on opposite sides of the slab 12 and extending lengthwise thereof. Reflector assemblies 23 and 24 extend around the flashlamps for gathering and reflecting the pumping energy from the lamps into the lasant slab 12. The flashlamps 21 and 22 and the lasant slab 12 are cooled by means of cooling gas, such as air, flowing through the conduits formed by the reflectors 23 and 24 and the opposed faces 13 and 14 of the slab 12.

As was pointed out above, some of the problems associated with the prior art gas cooled slab laser 11 of FIGS. 1 and 2 are that cooling of the lamps 21 and 22 and the slab 12 by the same flow of coolant creates heat gradients within the slab 12 that can result in anomalous thermal focusing effects in the slab 12. Moreover, due to the relatively low heat capacity of the gas, insufficient cooling is obtained for operation of the laser 11 at high average power levels, i.e., on the order of 1 kilowatt and above.

Referring now to FIG. 3, there is shown one embodiment of the present invention. More particularly, the lasant slab 12 is suspended within an optically transparent thermally conductive envelope or chamber 25, as of pyrex or sapphire. The reflectors 23 and 24 are sealed to the outer wall of the chamber 25 to define flashlamp coolant flow chambers 26 and 27, respectively. The chamber 25 is filled with a thermally conductive gas such as hydrogen, helium or air. In operation, the pumping radiation emanating from the lamps 21 and 22 is directed by the reflectors 23 and 24 through the optically transparent walls 28 and 29 of the chamber 25 and thence through the thermally conductive gas coolant and into the lasant slab 12 through the broad faces 13 and 14 thereof.

A high average power laser produces heat in the lasant slab 12 at a value approximately equal to the average output power of the output laser beam. Thus, a 1 kilowatt average power slab laser produces approximately 1 kilowatt of average power in the form of heat in the lasant slab. This heat is removed from the laser slab 12 by thermal conduction to the thin layer of thermally conductive gas within the chamber 25. In a typical example, this layer of thermally conductive gas has a thickness falling within the range of 0.005" to 0.100". Heat transferred to the conductive gas coolant is thence transferred to and through the thermally conductive optically transparent panes 28 and 29 and into the liquid coolant flow within chambers 26 and 27, otherwise used for cooling of the flashlamps 21 and 22. The amount of heat that has to be removed from the flashlamps 21 and 22 is approximately 100 times greater than the heat to be removed from the laser slab 12.

The advantage of the laser coolant system of FIG. 3, as contrasted with the prior art gas cooled laser of FIGS. 1 and 2 is that much higher average laser beam power levels can be obtained with the embodiment of FIG. 3 due to the high heat capacity of the liquid coolant flowing through the flashlamp coolant chambers 26 and 27. The heat generated in the lasant slab 12 is removed via the relatively high thermal conductive path through the relative thin layer of thermally conductive gas and thermally conductive panes 28 and 29 to the liquid flashlamp coolant. One remaining problem with this geometry is that approximately 98% of the flashlamp energy is dissipated into the flashlamp coolant and this means that the flashlamp coolant properties are far from ideal. The result is reduced as well as non-uniform heat removal from the laser slab 12.

The fundamental equation for the temperature change in the coolant system of FIG. 3 is:

$$\Delta T = \frac{Pl \cdot \gamma}{L \cdot W} \left( \frac{g}{kg} + \frac{P}{kp} \right) \quad \text{Eq. (1)}$$

$\Delta T$ = the temperature difference between the lasant slab 12 and the liquid coolant in lamp coolant chambers 26 and 27
pl = the power into the flashlamps
$\gamma$ = the fraction of energy left in the slab 12 as heat
g = the width of the gas space between slab faces 13 and 14 and respective panes 28 and 29
kg = the thermal conductivity of the gas in the gas space
P = the thickness of the panes 28 and 29
kp = the thermal conductivity of the panes 28 and 29
L = the length of the slab 12
W = the width of the slab 12

The major theoretical limitation on the maximum temperature of the slab 12 is the amount of lower level thermal population of the laser energy states that can be tolerated.

The major technical limitation to fabricating the system of FIG. 3 is the thickness of the gas space separating the laser slab from the cooling panes 28 and 29. Gas spaces of less than 0.005" thickness are quite difficult to fabricate in practice.

If a slab laser is constructed that is 36 cm long, 6.3 cm wide and 0.5 cm thick, it is capable of producing 40 joules/pulse at 25 hertz or 1,000 watts of average power. A laser typically deposits approximately its own power into the material as heat, so, 1,000 watts would be deposited in the slab. If 0.01% of the laser upper energy state population is acceptable in the lower state, then a maximum temperature rise of about 100 degrees K. can be tolerated.

The gas and pane material chosen are a compromise between heat dissipation and material cost. Table I lists a variety of material combinations, and calculates the gap spacing necessary to maintain less than 100 degrees K. temperature rise for the previously described 1 kilowatt laser.

TABLE I

| PANE | PANE THICKNESS | GAS | GAS SPACE THICKNESS |
|---|---|---|---|
| Sapphire | 0.065" (commercial) | Helium | 0.031" |
| Sapphire | 0.065" (commercial) | Air | 0.005" |
| Pyrex | 0.065" (commercial) | Helium | 0.022" |
| Pyrex | 0.065" (commercial) | Air | 0.003" |

Obviously, if the total deposited power is reduced, or if the size of the slab is increased, then the gas space thickness can be made correspondingly larger.

Figure 4:
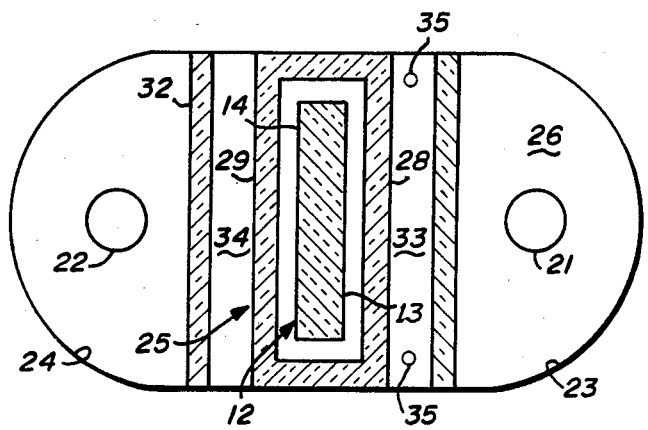
FIG. 4 is a view similar to that of FIG. 2 depicting an alternative embodiment of the present invention.

Referring now to FIG. 4, there is shown an alternative embodiment of the present invention. More particularly, this embodiment is similar to the embodiment of FIG. 3 with the exception that additional partitioning panes 31 and 32 are provided between the respective flashlamps 21 and 22 and the respective panes 28 and 29 of the gas-filled chamber 25. Panes 31 and 32 are optically transparent for passage of the pumping radiation therethrough and are spaced from the respective panes 28 and 29 of the gas-filled chamber 25 to provide additional liquid coolant flow chambers 33 and 34.

Liquid coolant flows through chambers 33 and 34 for removing the heat generated in the lasant slab 12 and transferred via the gas coolant through the respective panes 28 and 29 into the liquid coolant flowing within the chambers 33 and 34. Thermo couples 35 are disposed within the coolant chambers 33 and 34 for sensing the temperature of the liquid coolant flowing therein. Panes 31 and 32 serve to partition the liquid coolant flowing in the flashlamp chambers 26 and 27 for cooling of the flashlamps from the flow of coolant flowing in chambers 33 and 34 for cooling of the lasant slab 12. In this manner, additional control is provided over that provided in the system FIG. 3, for controlling the temperature of the slab 12. More particularly, the additional coolant chambers 33 and 34 provide thermal de-coupling between the function of cooling the laser slab 12 and cooling the flashlamps 21 and 22. This means that the various parameters necessary to cool the lasant slab 12 are under the control of the user by controlling the flow of liquid coolant through chambers 33 and 34.

The fundamental equation for the temperature difference between the liquid coolant in chamber 33 and 34 and the slab 12 is:

$$\Delta T = \frac{Pl \cdot \gamma}{L \cdot W}\left(\frac{g}{kg} + \frac{P}{kp} + \frac{1}{hf}\right) \quad \text{Eq. (2)}$$

The 1/hf term is the parameter generated by the slab coolant chambers 33 and 34 and is dependent on the flow velocity therein. It should be realized that the 1/hf term is not increasing the thermal conductance over the cooling system of FIG. 3, it is merely quantifying an unknown parameter. Three operating regimes exist for the cooling system of FIG. 4:

a. Conduction limited $$\left(\frac{g}{kg} + \frac{P}{kp}\right) >> \frac{1}{hf} \quad \text{Eq. (3)}$$

This is identical to the case of FIG. 3.

b. Flow limited $$\left(\frac{g}{kg} + \frac{P}{kp}\right) << \frac{1}{hf} \quad \text{Eq. (4)}$$

c. Transition $$\left(\frac{g}{kg} + \frac{P}{kg}\right) \cong \frac{1}{hf} \quad \text{Eq. (5)}$$

In both the flow-limited and transition cases, the laser slab temperature can be controlled by controlling the liquid coolant flow velocity in chambers 33 and 34. This provides a way to maintain a constant lower laser energy state population if so desired.

Taking the laser described above, (36 cm×6.3 cm×0.5—at 1,000 watts), examples of operation in both the conduction and flow-limited regimes are given as follows:

If the gas space is 0.005" of helium and the pane material is 0.065" of sapphire, then for a slab liquid coolant flow at a Reynolds number of 100 (29 ml/sec flow) a 16.8 degree K. temperature rise would be generated by the conduction term and a 68.8 degree K. rise by the flow term. This is basically a flow-limited geometry.

If the previous Reynolds number could be raised to 40,000 (11.6 l/sec. turbulent flow), then a 16.8 degree K. rise would still be generated by the conduction term, but a 2.98 degree K. rise would be contributed by the flow term. This is a conduction-limited geometry.

In general, slab lasers are not operated in either of the flow or conduction limited regimes, but rather in the transition regime where the conduction and flow terms are approximately the same. This has the effect of slightly decreasing the rate at which the temperature falls for an increase in flow velocity.

Figure 5:
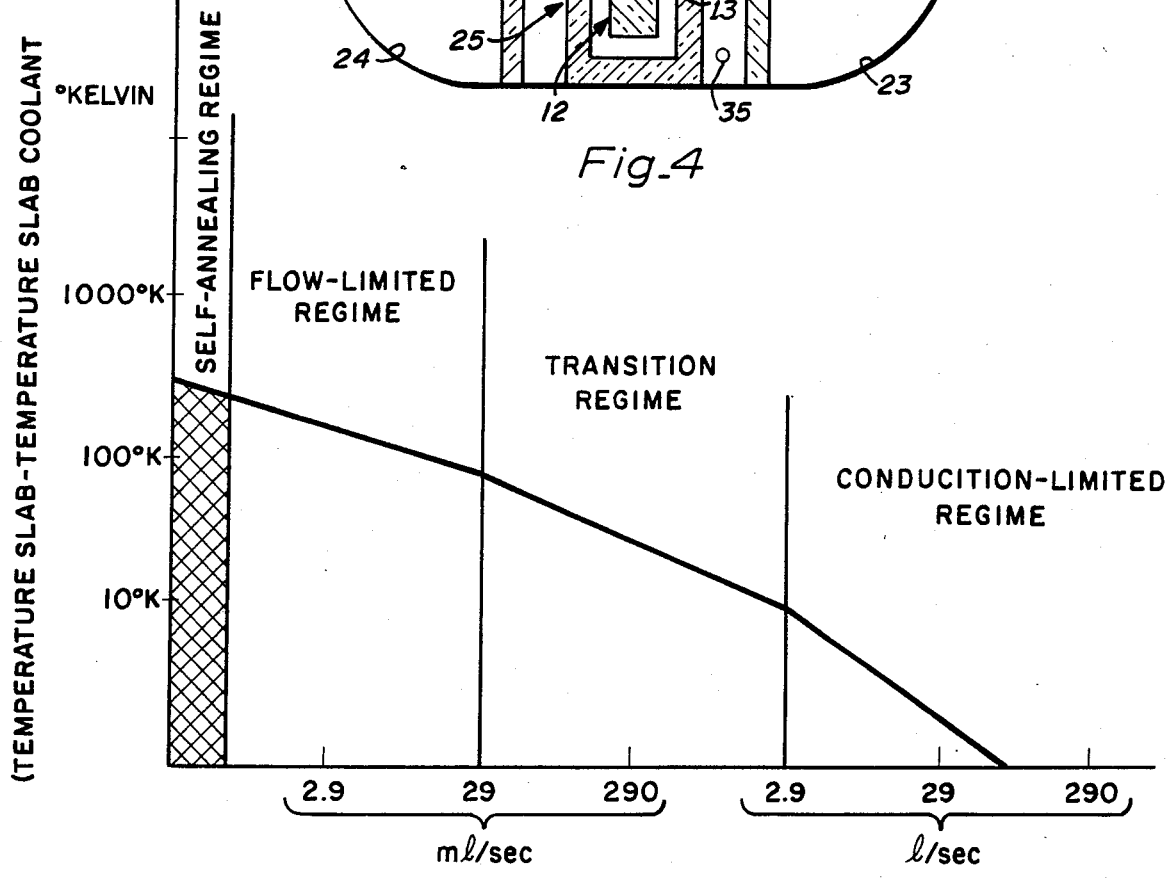
FIG. 5 is a plot of temperature of the laser slab in degrees Kelvin vs. Flow Velocity of the slab liquid coolant in liters and milliliters per second and depicting three operating regimes for a 1 kilowatt average power slab laser.

Referring now to FIG. 5, there is shown a plot of slab temperature or slab coolant temperature in degrees Kelvin vs. slab coolant flow velocity for the previously described 1,000 watt average output power slab laser of FIG. 4, assuming a hydraulic diameter of 0.98 cms, a friction factor of 0.002 and water slab coolant for the flow limited, transition, and conduction limited operating regimes.

In addition, a fourth operating regime is depicted and identified as "self-annealing regime". This regime is attained by adjusting the temperature of the slab 12 to a constant value at the low temperature annealing limit of the slab. In this case, the laser anneals out the stress induced by its own operation resulting in higher average output power for the laser beam. For typical lasant glasses, the low temperature annealing temperature is approximately 600 degrees Kelvin. At this temperature the lower level population of the laser energy states is still quite small, being approximately 0.9%.

If it is assumed that the laser of the previously two examples (40 joules/pulse, 36 cm×6.3 cm×0.5 cms, helium gas coolant at 0.005" gap spacing, sapphire panes 28 and 29 at 0.065" thickness, hydraulic diameter 0.98 for the slab coolant chambers 33 and 34, friction factor 0.002 for the slab coolant chambers 33 and 34 and water slab coolant) is operated as a self-annealing laser, then the maximum average output power is 17,757 watts. This is 40 joules per pulse at 442 hertz. If the output power were decreased, then the slab coolant flow velocity would be decreased in order to maintain the annealing temperature at the optimum value.

Various materials and gap spacings can be used to create lasers of different maximum average output power when operating in the self-annealing regime. Some examples follow below in Table II.

TABLE II

| PANE | PANE SPACING | GAS | GAS SPACING | MAXIMUM POWER |
|---|---|---|---|---|
| Sapphire | 0.065" | Helium | 0.005" | 17,757 watts |
| Pyrex | 0.065" | Helium | 0.005" | 6,693 |
| Pyrex | 0.065" | Helium | 0.020" | 3,247 |
| Sapphire | 0.065" | Helium | 0.020" | 4,654 |
| Sapphire | 0.065" | Air | 0.005" | 2,832 |
| Pyrex | 0.065" | Air | 0.005" | 2,241 |
| Pyrex | 0.065" | Air | 0.020" | 669 |
| Sapphire | 0.065" | Air | 0.020" | 712 |

In the case of a self-annealing laser, the laser should not be turned off abruptly. Instead, it should be slowly warmed and slowly shut-off.

What is claimed is:

1. In a method for operating a slab laser of the type wherein a slab of lasant material having a pair of broad faces separated by at least one narrow face, is optically pumped by optical radiation directed into the lasant slab through at least one of said broad faces to produce stimulated emission of coherent radiation within the lasant slab, such stimulated emission of radiation being internally reflected of the slab along a zig-zag path back-and-forth between said pair of broad faces, THE IMPROVEMENT COMPRISING:

cooling said optically pumped broad face of said lasant material predominantly by heat transfer to a gas coolant disposed in heat exchanging relation with said optically pumped broad face of said lasant slab;

cooling said gas coolant predominantly by heat transfer to a flow of optically transparent liquid coolant partitioned from said gas coolant via an optically transparent thermally conductive liquid-gas partition; and passing said pumping radiation through said liquid coolant, said liquid-gas partition, and said gas coolant to said slab.

2. The method of claim 1 including the step of controlling the flow of heat from said gas coolant into said liquid coolant such that the broad face of said slab, which is cooled directly by said gas coolant, operates at a temperature above 100 degrees C.

3. The method of claim 1 including the step of controlling the flow of heat from said slab to said liquid coolant such that said broad face of said slab which is cooled directly by said gas coolant operates at an annealing temperature for said slab material, whereby operating stress generated in said slab is annealed out by operation of said slab laser.

4. The method of claim 3 wherein said slab of lasant material is made of glass.

5. The method of claim 3 wherein said slab of lasant material is made of Nd:glass.

6. The method of claim 1 wherein said optically transparent thermally conductive partition is made of a material selected from the group consisting of sapphire and glass.

7. The method of claim 1 wherein the source of pumping radiation is a lamp and including the step of,
cooling the lamp by flowing liquid coolant past said lamp in heat exchanging relation therewith for cooling of said lamp;
partitioning the flow of liquid coolant for said lamp from the flow of liquid coolant for said gas by means of a second optically transparent partition; and
passing said pumping radiation through said liquid coolant for said lamp, said second optically transparent partition, said liquid coolant for said gas, said liquid-gas partition, and said gas coolant to said slab.

8. In a slab laser of the type wherein a slab of lasant material having a pair of broad faces separated by at least one narrow face, is optically pumped by optical radiation directed into said lasant slab through at least one of said broad faces to produce stimulated emission of coherent radiation within said lasant slab, such stimulated emission of radiation being internally reflected of said slab back-and-forth between said broad faces along a zig-zag path, THE IMPROVEMENT COMPRISING:

means for cooling said optically pumped broad face of said lasant material predominantly by heat transferred to a gas coolant disposed in heat exchanging relation with said optically pumped broad face of said lasant slab;

means for cooling said gas coolant predominantly by heat transfer to a flow of optically transparent liquid coolant;

means for partitioning said gas coolant from said flow of liquid coolant via an optically transparent thermally conductive liquid-gas partitioning means; and means for directing said pumping radiation through said liquid coolant, said liquid-gas partitioning means and said gas coolant to said slab.

9. The apparatus of claim 8 wherein said slab of lasant material is made of glass.

10. The apparatus of claim 8 wherein said slab of lasant material is made of Nd:glass.

11. The apparatus of claim 8 wherein said optically transparent thermally conductive partitioning means is made of a material selected from the group consisting of sapphire and glass.

12. The apparatus of claim 8 including, lamp means serving as the source of the pumping radiation;
cooling means for cooling said lamp means by flowing liquid coolant past said lamp means in heat exchanging relation therewith for cooling of said lamp means;
lamp partitioning means for partitioning the flow of coolant for said lamp means from the flow of liquid coolant for said gas coolant, said lamp partitioning means being optically transparent; and
means for directing said pumping radiation from said lamp means through said liquid coolant for said lamp means, said lamp partitioning means, said liquid coolant for said gas coolant, said liquid-gas partitioning means, and said gas coolant to said slab.

* * * * *